US008711176B2

(12) United States Patent
Douris et al.

(10) Patent No.: US 8,711,176 B2
(45) Date of Patent: Apr. 29, 2014

(54) VIRTUAL BILLBOARDS

(75) Inventors: Stephan Douris, San Jose, CA (US);
Marc Perry, San Francisco, CA (US);
Barry Crane, Menlo Park, CA (US);
Chris Kalaboukis, Los Gatos, CA (US);
Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 947 days.

(21) Appl. No.: 12/125,891

(22) Filed: May 22, 2008

(65) Prior Publication Data

US 2009/0289956 A1 Nov. 26, 2009

(51) Int. Cl.
*G09G 5/00* (2006.01)
*G09G 5/08* (2006.01)
*G06K 9/00* (2006.01)
*G06Q 30/00* (2012.01)
*G06F 21/00* (2013.01)
*G06T 19/00* (2011.01)
*G06T 7/00* (2006.01)
*G06Q 30/02* (2012.01)
*G06F 17/30* (2006.01)
*G01C 21/36* (2006.01)
*G01C 11/02* (2006.01)
*G02B 27/01* (2006.01)

(52) U.S. Cl.
CPC .............. *G06T 19/006* (2013.01); *G06T 7/004* (2013.01); *G06Q 30/0267* (2013.01); *G06Q 30/0259* (2013.01); *G06Q 30/0273* (2013.01); *G06Q 30/0241* (2013.01); *G06Q 30/0251* (2013.01); *G06Q 30/0269* (2013.01); *G06Q 30/0205* (2013.01); *G01C 21/3644* (2013.01); *G01C 11/02* (2013.01); *G06F 17/30241* (2013.01); *G06F 17/3087* (2013.01); *G06F 17/30041* (2013.01); *G06F 17/30047* (2013.01); *G02B 27/017* (2013.01); *G02B 2027/0178* (2013.01)
USPC .............. 345/633; 345/8; 345/158; 382/106; 382/154; 705/7.31; 705/14.4; 705/14.49; 705/14.58; 705/14.64; 705/14.66; 705/14.69; 705/26.1; 705/27.1; 705/52; 705/56

(58) Field of Classification Search
CPC .................... G02B 27/017; G02B 2027/0178; G02B 2027/014; G02B 27/01; G06F 17/30241; G06F 17/3087; G06F 17/30041; G06F 17/30047; G06T 19/006; G06T 7/004; G01C 21/3644; G01C 11/02; G06Q 30/0267; G06Q 30/0259; G06Q 30/0273; G06Q 30/0241; G06Q 30/0251; G06Q 30/0269; G06Q 30/0205
USPC .............. 345/632, 633, 8, 158; 382/106, 154; 705/26.1, 27.1, 7.31, 14.69, 14.4, 52, 705/14.49, 14.66, 14.58, 14.64, 56
See application file for complete search history.

(56) References Cited

U.S. PATENT DOCUMENTS

| | | | |
|---|---|---|---|
| 6,037,936 A * | 3/2000 | Ellenby et al. | 715/764 |
| 6,292,158 B1 * | 9/2001 | Amafuji et al. | 345/7 |
| 6,512,919 B2 * | 1/2003 | Ogasawara | 455/422.1 |
| 6,629,097 B1 * | 9/2003 | Keith | 1/1 |
| 7,084,887 B1 * | 8/2006 | Sato et al. | 345/633 |
| 7,091,989 B2 | 8/2006 | Gibbs et al. | |
| 7,101,284 B2 * | 9/2006 | Kake et al. | 463/31 |
| 7,421,467 B2 * | 9/2008 | Kaneko et al. | 709/201 |
| 7,538,782 B2 * | 5/2009 | Kuroki et al. | 345/632 |
| 7,555,725 B2 * | 6/2009 | Abramson et al. | 715/781 |
| 7,690,990 B2 * | 4/2010 | Van Luchene | 463/25 |
| 8,073,795 B2 | 12/2011 | Honisch | |
| 8,275,414 B1 | 9/2012 | Athsani et al. | |
| 2002/0075282 A1 * | 6/2002 | Vetterli et al. | 345/632 |
| 2003/0014212 A1 * | 1/2003 | Ralston et al. | 702/150 |
| 2003/0025714 A1 * | 2/2003 | Ebersole et al. | 345/632 |
| 2003/0065768 A1 | 4/2003 | Malik | |
| 2003/0095681 A1 | 5/2003 | Burg et al. | |
| 2006/0038833 A1 * | 2/2006 | Mallinson et al. | 345/633 |
| 2006/0104483 A1 | 5/2006 | Harel et al. | |
| 2006/0242017 A1 * | 10/2006 | Libes et al. | 705/14 |
| 2006/0293557 A1 * | 12/2006 | Chuanggui et al. | 600/101 |
| 2007/0015586 A1 * | 1/2007 | Huston | 463/42 |

| | | | |
|---|---|---|---|
| 2007/0106721 | A1 | 5/2007 | Schloter |
| 2007/0162942 | A1 | 7/2007 | Hamynen et al. |
| 2007/0164988 | A1 | 7/2007 | Ryu et al. |
| 2007/0205963 | A1* | 9/2007 | Piccionelli et al. ............... 345/7 |
| 2007/0236514 | A1* | 10/2007 | Agusanto et al. ............. 345/646 |
| 2008/0071559 | A1 | 3/2008 | Arrasvuori |
| 2009/0018915 | A1* | 1/2009 | Fisse ............................... 705/14 |
| 2009/0081959 | A1 | 3/2009 | Gyorfi et al. |
| 2009/0189974 | A1* | 7/2009 | Deering .......................... 348/46 |

OTHER PUBLICATIONS

Mediaseek releases "Camera Dictionary" the application that translates English words by simply scanning the mobile's camera over words. http://www.slashphone.com/64/51775.html, printed Oct. 4, 2007 (3 pages).
David Derbyshire, "Phones or iPod a thing of the past," http://www.dailymail.co.uk/pages/live/articles/news/news.html?in_article_id=533358&in_ . . . printed Mar. 21, 2008 (pp. 3-11).
Future of Internet Search: Mobile version, http://petitinvention.wordpress.com/2008/02/10/future-of-interest-search-mobile-version/ printed Mar. 21, 2008 (pp. 1-19).
Athsani et al., "User Augmented Reality for Camera-Enabled Mobile Devices," Yahoo! Inc., U.S. Appl. No. 11/874,389, filed Oct. 18, 2007.
Douris et al., "Reality Overlay Device," Yahoo! Inc., U.S. Appl. No. 12/125,877, filed May 22, 2008.
Google Mobile—SMS http://www.google.com/intl/en_us/mobile/default/sms.html, printed Feb. 4, 2009 (2 pages).
Yahoo! Babel Fish—Text Translation and Web Page Translation, http://babelfish.yahoo.com/, printed Feb. 4, 2009.
Attributor: Overview—Monitor your content and improve your content syndication, http://www.attributor.com/how_it_works/overview.php, printed Feb. 4, 2009 (12 pages).
Google, Neven Vision & Image Recognition, Search Engine Journal, http://www.searchenginejournal.com/google-neven-vision-image-recognition/3728/#more-3728, printed Feb. 4, 2009.
Downloads—pgp.comFree PGP Encryption Platform Evaluation—Download PGP Univers . . . http://www.pgp.com/downloads/destoptrial/index.html printed Feb. 4, 2009 (1 page).
PGP Whole Disk Encryption—Comprehensive Hard Drive Encryption for PC's, Laptops and . . . http://www.pgp.com/products/wholediskencryption/index.html, printed Feb. 4, 2009, (2 pages).
Callas J., et al. Open PGP Message Format; http://www.ietf.org/rfc/rfc2440.txt, Request for Comments 2440, International Engineering Task Force, Nov. 1998.
Non-Final Office Action dated Dec. 28, 2010, from U.S. Appl. No. 12/125,877.
Final Office Action dated Jun. 1, 2011, from U.S. Appl. No. 12/125,877.
Non-Final Office Action dated Sep. 29, 2011, from U.S. Appl. No. 11/874,389.
Notice of Allowance dated Jan. 19, 2012, from U.S. Appl. No. 11/874,389.
Supplemental Notice of Allowance dated Feb. 27, 2012, from U.S. Appl. No. 11/874,389.
Notice of Allowance dated Jul. 12, 2012, from U.S. Appl. No. 13/470,042.
Supplemental Notice of Allowance dated Jul. 31, 2012, from U.S. Appl. No. 13/470,042.
Office Action dated May 11, 2012, from U.S. Appl. No. 12/125,877.
Final Office Action dated Sep. 12, 2012, U.S. Appl. No. 12/125,877.

* cited by examiner

*Primary Examiner* — Jeffrey Chow
(74) *Attorney, Agent, or Firm* — Weaver Austin Villeneuve & Sampson LLP

(57) ABSTRACT

Disclosed are methods and apparatus for implementing a reality overlay device. A reality overlay device captures information that is pertinent to physical surroundings with respect to a device, the information including at least one of visual information or audio information. The reality overlay device may transmit at least a portion of the captured information to a second device. For instance, the reality overlay device may transmit at least a portion of the captured information to a server via the Internet, where the server is capable of identifying an appropriate virtual billboard. The reality overlay device may then receive overlay information for use in generating a transparent overlay via the reality overlay device. The transparent overlay is then superimposed via the device using the overlay information, wherein the transparent overlay provides one or more transparent images that are pertinent to the physical surroundings. Specifically, one or more of the transparent images may operate as "virtual billboards." Similarly, a portable device such as a cell phone may automatically receive a virtual billboard when the portable device enters an area within a specified distance from an associated establishment.

37 Claims, 10 Drawing Sheets

VIRTUAL BILLBOARDS

BACKGROUND OF THE INVENTION

The disclosed embodiments relate generally to methods and apparatus for presenting virtual billboards via a computer-implemented device.

Currently, advertisements are commonly implemented in the form of physical billboards, signs, and flyers. These types of physical advertisements are static in size and content, and cannot easily be modified. Unfortunately, these types of advertisements consume a significant amount of physical resources and create unnecessary pollution when the advertisements are discarded. In addition, physical billboards and signs also obscure the natural surroundings being viewed.

Advertisements may also be provided via the Internet. These types of advertisements must be placed "manually" and remain static until the advertiser decides to take down the advertisement. The context in which these advertisements are presented is typically determined based upon preferences of the advertiser. For example, the advertiser may pay for specific search terms that trigger the placement of the advertisement. Unfortunately, a user browsing the Internet cannot typically avoid such advertisements.

In view of the above, it would be beneficial if alternate means for generating advertisements could be established.

SUMMARY OF THE INVENTION

In accordance with one embodiment, virtual billboards including information such as advertisements or offers may be viewed via a reality overlay device. A reality overlay device may be implemented in a variety of forms. In one embodiment, the reality overlay device is a wearable device. Through the use of a reality overlay device, a user may perceive an overlay that is superimposed over the user's physical surroundings. The overlay may include a visual transparent overlay in correlation with the physical surroundings as viewed by the user through the reality overlay device. Moreover, the overlay may also include an audio overlay that generates sounds that are not present in the physical surroundings. Thus, a virtual billboard may be presented via a visual transparent overlay and/or audio overlay. In accordance with one embodiment, a reality overlay device automatically captures information that is pertinent to physical surroundings with respect to a device, the information including at least one of visual information or audio information. The reality overlay device may automatically transmit at least a portion of the captured information to a second device. For instance, the reality overlay device may transmit at least a portion of the captured information to a server via the Internet, where the server is capable of identifying an appropriate virtual billboard. The reality overlay device may then automatically receive overlay information for use in generating a transparent overlay via the reality overlay device. The transparent overlay is then automatically superimposed via the device using the overlay information, wherein the transparent overlay provides one or more transparent images that are pertinent to the physical surroundings.

In accordance with another embodiment, a network device such as a server may receive information that is pertinent to physical surroundings with respect to a reality overlay device, the information including at least one of visual information or audio information. The network device may obtain overlay information for use in generating a transparent overlay via the reality overlay device using at least a portion of the received information, where the transparent overlay provides one or more transparent images that are pertinent to the physical surroundings. The network device may then transmit the overlay information to the reality overlay device. For example, the network device may be implemented as a server associated with a website.

In accordance with yet another embodiment, the overlay information may include audio overlay information. An audio overlay may then be generated using the audio overlay information.

In accordance with yet another embodiment, the transparent images of a transparent overlay may include one or more virtual billboards. For instance, a virtual billboard may include information associated with an entity (e.g., business) for which the virtual billboard is presented. For instance, the information may include an advertisement, offer, menu, reviews of the business, or information associated with an affiliate of the business. The entity may be a business such as a restaurant that pays for the virtual billboard to be presented. The entity may specify circumstances under which a virtual billboard is to be displayed. For instance, a business such a restaurant may pay for a virtual billboard to be presented where the reality overlay device is used within a particular distance of the business. However, a user viewing the virtual billboards may also control the circumstances under which the virtual billboards are presented, as well as the manner in which the virtual billboards are displayed. Moreover, virtual billboards may also be tailored to a user's preferences.

In accordance with yet another embodiment, the virtual billboards may be displayed in correlation with the physical surroundings. More specifically, the placement of the virtual billboards within a transparent overlay may be determined based upon the context in which the virtual billboards are displayed. For instance, a virtual billboard may be displayed in front of or next to a business for which the virtual billboard is displayed.

In accordance with yet another embodiment, a business may customize virtual billboards and the circumstances in which the virtual billboards are to be presented by accessing a web site via the Internet. More specifically, a web site may receive a virtual billboard submission associated with a business. In addition, the web site may receive information indicating a distance from the business within which the virtual billboard is to be displayed via a network device. The web site may then store the virtual billboard and the distance (and any other business preferences), where the virtual billboard is to be provided to network devices that enter an area that is within the distance from the business.

In accordance with yet another embodiment, a business may submit billboards and associated information online via a web site. More specifically, a device (e.g., computer located at the business) may receive a virtual billboard, where the virtual billboard is associated with a business. The device may also receive information indicating a distance from the business within which the virtual billboard is to be displayed via a network device, wherein the virtual billboard is to be provided to network devices when the network devices enter an area that is within the distance from the business. The device may then transmit the virtual billboard and the information to the web site, enabling the web site to store this information and subsequently transmit the virtual billboard under circumstances as specified by the business. The business may accrue a charge when the virtual billboard is displayed via a network device. Moreover, a charge accrued by the business may depend upon the distance from the business within which the virtual billboard is to be displayed.

In accordance with yet another embodiment, once virtual billboards and conditions for their transmission are set up, a web site may transmit the virtual billboards under the conditions specified by the business. More specifically, the web site may receive information indicating a location of a network device. The web site may determine from the location of the network device whether the network device is within a specified distance from the business, wherein a virtual billboard associated with the business is to be provided to network devices that enter an area that is within the distance from the business. The web site may then transmit the virtual billboard to the network device when it is determined that the network device has entered the area that is within the distance from the business.

In accordance with yet another embodiment, a portable network device such as a wireless device may automatically transmit information indicating a location of the network device to a web site. The network device may then receive a virtual billboard associated with a business when the network device enters an area that is within a pre-defined distance from the business. For example, the virtual billboard may include an advertisement associated with the business or information associated with an affiliate of the business.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments support the implementation of a reality overlay device that may be used by a user to receive information that is pertinent to the physical surroundings of the user. More specifically, the reality overlay device enables an overlay to be superimposed onto a real-world view that is perceived by a user of the device. The overlay may include an audio overlay and/or a transparent visual overlay. Specifically, the transparent visual overlay may be displayed such that it overlays the field of vision of the wearer of the overlay device.

In one embodiment, the overlay enables a "virtual billboard" to be presented. The virtual billboard may include information associated with an entity (e.g., real world establishment). For example, such an entity may be a business such as a restaurant. Thus, the virtual billboard may include an advertisement, menu, reviews, offers, or any other information associated with the entity (or affiliates of the entity) for which the virtual billboard is provided.

Figure 1:
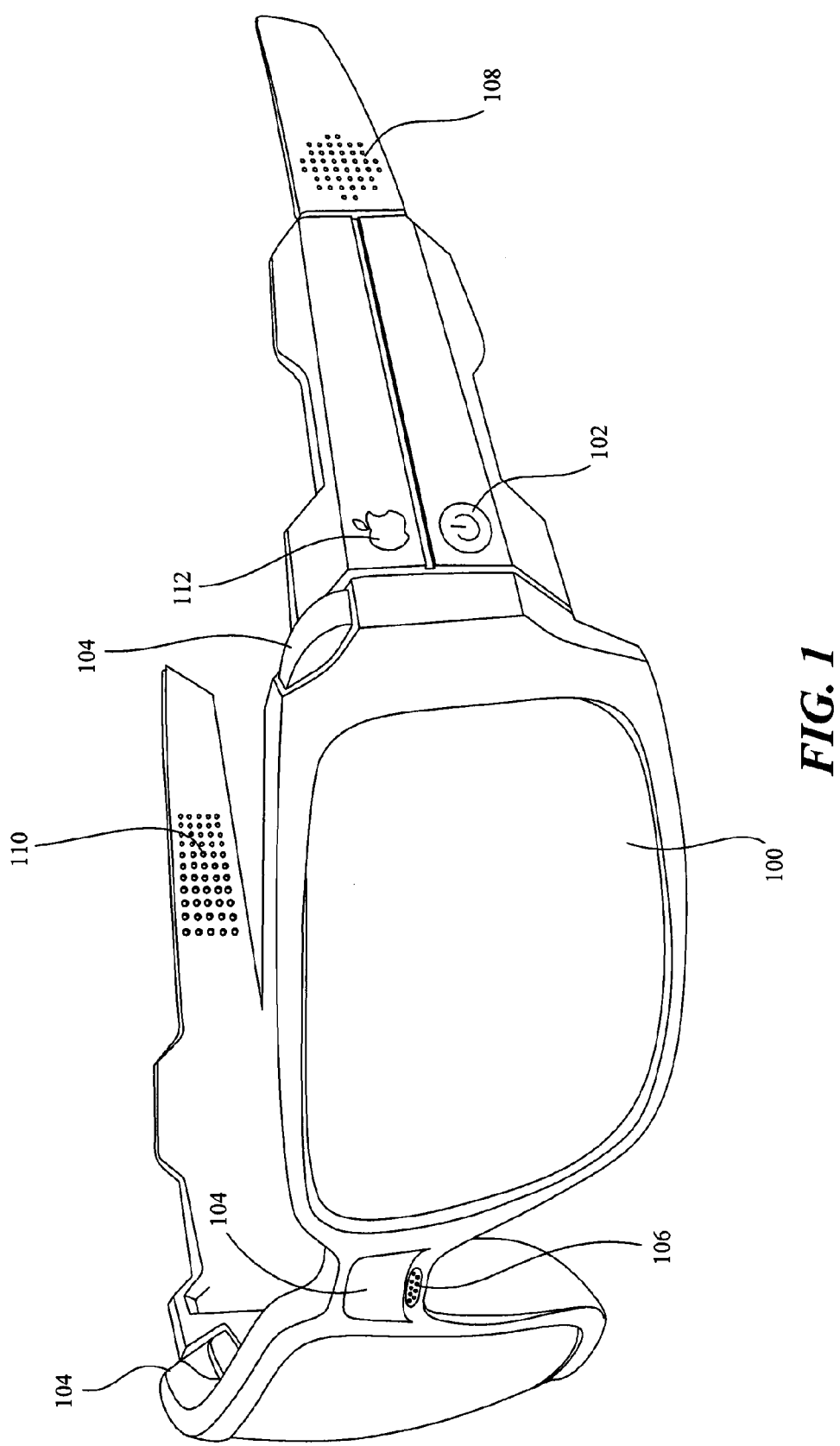
FIG. 1 is a diagram illustrating an example reality overlay device in which various embodiments may be implemented.

FIG. 1 is a diagram illustrating an example reality overlay device in which various embodiments may be implemented. In one embodiment, the reality overlay device is a device that is wearable by the user of the device. In this example, the reality overlay device is shaped in the form of glasses or sunglasses that a user may wear. More specifically, the reality overlay device may include one or more transparent lenses 100 that enable a user to view his or her surroundings through the transparent lenses 100. Specifically, the transparent lenses 100 may function as screens that enable a transparent overlay to be displayed. In some embodiments, the lenses 100 may become opaque in order for the viewer to perform various tasks such as word processing functions and/or viewing of movies. In one embodiment, each of the lenses 100 may include a liquid crystal display (LCD).

The reality overlay device may support connection to a wireless network such as a cell phone network, localized Bluetooth™ devices, Worldwide Interoperability for Microwave Access (Wi-MAX) and Wireless Fidelity (Wi-Fi). In addition, the device may support other communication mechanisms such as a Universal Serial Bus (USB), etc. A start button 102 may enable the user to turn the reality overlay device on (or off). In one embodiment, when the reality overlay device is off, the device may be used as a pair of sunglasses. When the reality overlay device is on, the device may receive and capture information that is pertinent to physical surroundings with respect to the reality overlay device. For instance, the information that is captured may include visual and/or audio information.

The visual information may be captured via one or more visual inputs such as visual sensors 104. For instance, each of the visual sensors 104 may be a still or video camera that is capable of capturing one or more still images or video images, respectively. These images may be captured in two-dimensional form or three-dimensional form. In one embodiment, the visual sensors 104 may include two sensors, where one of the sensors 104 is positioned at the left side of the lenses 100 of the reality overlay device and another one of the sensors 104 is positioned at the right side of the lenses 100 of the reality overlay device. For instance, the sensors 104 may be placed near the hinges of the reality overlay device, as shown. In this manner, the two sensors 104 may capture images that would be viewed by a user's left and right eyes. The images captured via the two sensors 104 may be combined to replicate a single image that would be perceived by a user viewing the two separate images through the two different lenses 100. The visual sensors 104 may further include a third sensor at the center of the lenses 100 of the reality overlay device. In this manner, a transparent overlay may be generated and displayed in direct correlation with objects being viewed by the user.

The audio information may be captured via one or more audio sensors. For instance, the audio sensors may include one or more microphones. As shown in this example, one or more microphones 106 may be provided on the bridge of the reality overlay device for purposes of capturing voice commands from a user of the reality overlay device and/or surrounding sounds. Moreover, the reality overlay device may also support voice recognition to assist in capturing voice commands. In addition, the audio sensors may include one or more sound captors (e.g., microphones) 108 at various locations on the reality overlay device. In this example, the sound captors 108 include two different sound captors, where each of the sound captors is positioned on the external side of one of the arms of the reality overlay device. The sound captors 108 may function to receive sounds from the surroundings (e.g., rather than the user of the device).

The information that is captured by the device may also include information such as a location of the device (e.g, coordinates of the device), an orientation of the device, or a speed with which the device is traveling. For example, the reality overlay device may include a global positioning system (GPS) device to enable coordinates of the reality overlay device to be determined. As another example, the reality overlay device may include one or more gyroscopes that may be used to determine an orientation of the reality overlay device. As yet another example, the reality overlay device may include an accelerometer that may be used to determine a speed with which the reality overlay device is traveling.

Other information that may be captured by the device may include identifying one or more entities in the field of vision of the reality overlay device. For instance, the reality overlay device may support pattern recognition. More specifically, the reality overlay device may process at least a portion of the received information (e.g., one or more images) in order to identify one or more entities using pattern recognition. Such entities may include environmental features such as a mountain, road, building, or sidewalk. Moreover, entities that are recognized may also include people or animals. Pattern recognition may also be used to identify specific buildings by identifying letters, words, or addresses posted in association with a particular building. In addition, the device may enable entities to be recognized by Radio Frequency Identification (RFID) or similar hardware tag. Similarly, entities may be recognized using the location of the device and orientation of the device.

The reality overlay device may obtain overlay information for use in generating and providing a transparent visual overlay and/or "audio overlay" via the device using at least a portion of the information that the reality overlay device has captured. The overlay information may be obtained locally via one or more local memories and/or processors. The overlay information may also be obtained remotely from one or more servers using an Internet browser via a wireless connection to the Internet. More specifically, in order to obtain the overlay information, the reality overlay device or a remotely located server may identify one or more entities in the information that the reality overlay device has captured. This may be accomplished by accessing a map of the location in which the reality overlay device is being used, RFID, and/or by using pattern recognition, as set forth above. Information that is pertinent to the identified entities may then be obtained.

The overlay information may also specify placement of visual overlay information within the transparent visual overlay (e.g., with respect to identified entities). More specifically, the location of the entities in the visual information may be used to determine an optimum placement of the visual overlay information within the transparent visual overlay. For example, where one of the entities is a restaurant, the visual overlay information including a virtual billboard associated with the restaurant may be placed immediately next to the restaurant. As another example, where one of the entities is a road, directions or a map may be placed such that the road in the user's field of vision is not obstructed.

The reality overlay device may superimpose the transparent overlay via the device using the overlay information via one or more of the lenses 100, wherein the transparent overlay provides one or more transparent images (e.g., static or video) that are pertinent to the physical surroundings. The positioning of the transparent images may depend upon the location of any identified entities in the user's field of vision (e.g., to reduce obstruction of the user's field of vision). The transparent images that are produced may include text, symbols, etc. The transparent images may be generated locally or remotely. In this manner, a user of the reality overlay device may view real world images through the lenses 100 while simultaneously viewing the transparent overlay.

Similarly, in accordance with various embodiments, audio overlay information may be provided via one or more audio outputs (e.g., speakers) of the reality overlay device. In this example, the reality overlay device includes a headphone 110 that includes a speaker on the internal side of both the left and right arms of the reality overlay device. In this manner, a user may receive audio overlay information such as directions that would not impact the user's field of vision.

The reality overlay device may further include a visual indicator 112 that signals that the user is online or offline. The visual indicator 112 may also be used to indicate whether the user is on a wireless call.

The identity of the user of the device may be ascertained and used in various embodiments in order to tailor the operation of the device to the user's preferences. An identity of the user (e.g., owner) of the device may be statically configured. Thus, the device may be keyed to an owner or multiple owners. In some embodiments, the device may automatically determine the identity of the user (i.e., wearer) of the device. For instance, a user of the device may be identified by deoxyribonucleic acid (DNA) and/or retina scan.

It is important to note that the reality overlay device shown and described with reference to FIG. 1 is merely illustrative, and therefore the reality overlay device may be implemented in different forms. Moreover, the reality overlay device may support some or all of the above listed features, as well as additional features not set forth herein.

Figure 2:
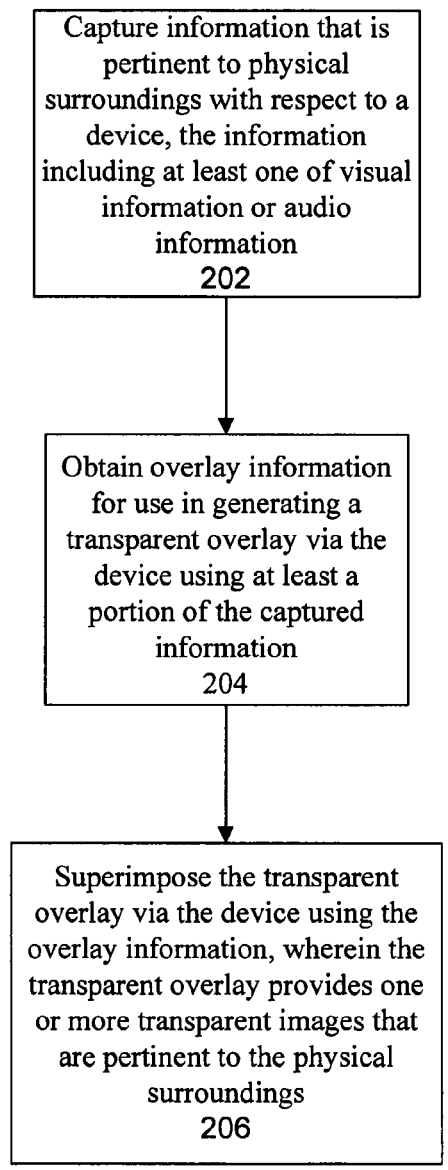
FIG. 2 is a process flow diagram illustrating an example method of presenting an overlay via a reality overlay device such as that presented in FIG. 1.

FIG. 2 is a process flow diagram illustrating an example method of presenting an overlay via a reality overlay device such as that presented in FIG. 1. The reality overlay device captures information that is pertinent to physical surroundings with respect to the reality overlay device at 202, where the information includes at least one of visual information or audio information. As set forth above, the visual information may include one or more images. The information that is received may further include a location of the device, orientation (e.g., angle) of the device with respect to one or more axes, and/or speed with which the device is moving, etc.

The reality overlay device obtains overlay information for use in generating a transparent overlay via the device using at least a portion of the captured information at 204. Overlay information may include a variety of information that may be used to generate a transparent overlay. Thus, the overlay information may include, but need not include, the actual image(s) displayed in order to superimpose the transparent overlay. In order to obtain the overlay information, one or more entities in the surroundings or in nearby locations may be identified in the captured information. For example, entities such as businesses, other buildings or physical landmarks may be identified using pattern recognition software, RFID and/or GPS location. Similarly, individuals may be identified using technology such as RFID or other forms of signals transmitted by another individual's device.

The overlay information that is obtained may include information that is pertinent to the identified entities. For instance, the overlay information may include directions to the identified entities, maps, descriptions, reviews, advertisements, menus, etc. Moreover, the overlay information may indicate placement of one or more transparent images (e.g., advertisements, menus, maps, directions, reviews) with respect to entities that have been identified using the captured information, as perceived by the user of the reality overlay device.

The reality overlay information may also be obtained using user information associated with a user of the device. For instance, information such as the identity of the user, preferences of the user, friends of the user, and/or a history of purchases of the user may be used to obtain the reality overlay information.

The overlay information may be obtained locally via a memory and/or remotely from a server via the Internet. For instance, pattern recognition capabilities may be supported locally or remotely at a remotely located server. The reality overlay information may identify one or more entities such as physical locations, buildings, or individuals, as well as information associated with these entities. Moreover, the reality overlay information may include directions or maps in the form of text, arrows and/or other indicators associated with such entities.

The content of the overlay information is not limited to the examples described herein, and a variety of uses are contemplated. For instance, the overlay information may identify restaurants that the user may be interested in within the context of the surroundings. Similarly, the overlay information may include additional information associated with various entities, such as menus, advertisements, offers, reviews, information associated with "affiliate" businesses, etc.

The reality overlay device may then superimpose the transparent overlay via the device using the overlay information, wherein the transparent overlay provides one or more transparent images that are pertinent to the physical surroundings at 206. The transparent images may be static images or video images. Moreover, the transparent images may be two-dimensional or three-dimensional images. The overlay may be provided for use in a variety of contexts. For example, a transparent image providing directions to destinations such as restaurants that may interest the user may be provided via the reality overlay device. As another example, a transparent image may be used to provide a menu of a restaurant. Alternatively, the transparent images may be provided in the form of video.

The steps 202-206 performed by the reality overlay device may be performed automatically by the reality overlay device. In other words, the reality overlay device may operate without requiring a user to input information or otherwise request information.

The reality overlay device may record captured visual and/or audio information, as well as corresponding superimposed transparent overlays in a local memory. In this manner, the user may store and later view real-life experiences with the benefit of superimposed transparent overlays. Thus, the device may display such recordings including captured information and associated superimposed visual and/or audio overlays.

The reality overlay device may also receive user input that is pertinent to the transparent overlay. For example, where the transparent overlay presents a menu for a restaurant, the user may choose to order from the menu. The reality overlay device may process the user input and/or transmit the user input to another entity such as an entity that has been identified using the previously captured information. For example, the reality overlay device may provide the user's order to the restaurant.

The reality overlay device may receive user input via a variety of mechanisms via a physical or wireless connection. More particularly, the reality overlay device may receive a voice command from the user or a command received via another mechanism (e.g., hand movement or other gestures). Moreover, user input may also be captured via DNA, an eye focus tracking mechanism, a retina scan, an associated keyboard such as a bluetooth keyboard, other Bluetooth enabled devices, bar code scanners, RFID tags, etc.

Similarly, the reality overlay device may be connected to another device via a physical or wireless connection for providing output. For instance, the reality overlay device may be connected to a television in order to display captured images (and any associated audio information) and/or pertinent transparent overlays (and any associated audio information). As another example, users of different overlay devices may connect to one another for purposes of sharing the same experience (e.g., visiting a city or playing a game).

Figure 3:
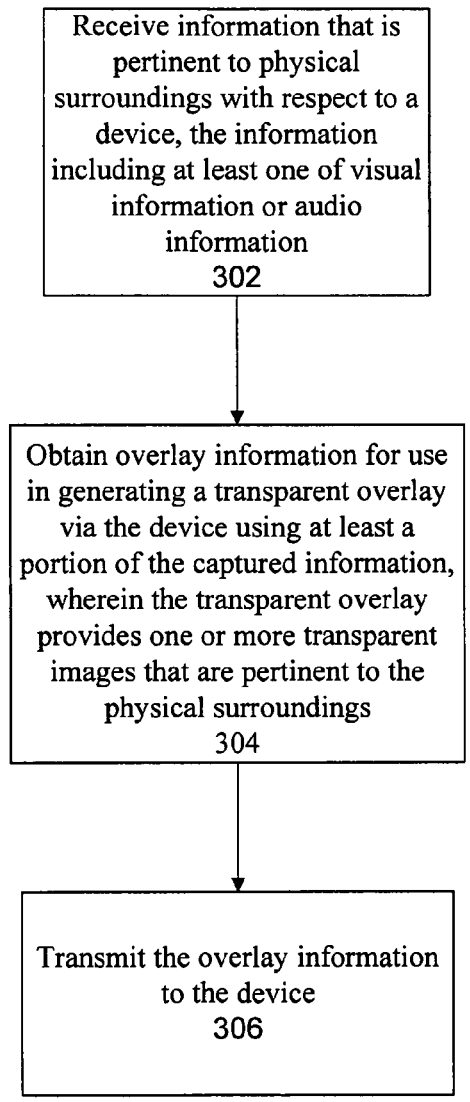
FIG. 3 is a process flow diagram illustrating an example method of providing information to a reality overlay device such as that presented in FIG. 1.

FIG. 3 is a process flow diagram illustrating an example method of providing information to a reality overlay device such as that presented in FIG. 1. A server may receive information that is pertinent to physical surroundings with respect to a device from the device at 302, where the information includes at least one of visual information or audio information. More specifically, the server may receive at least a portion of the information that has been captured by the reality overlay device. As set forth above, the information that is pertinent to the surroundings with respect to the device may include at least one of a location of the device, an orientation of the device, or a speed with which the device is traveling. The server may also receive user information associated with a user of the device.

The server may obtain (e.g., retrieve and/or generate) overlay information for use in generating a transparent overlay via the device using at least a portion of the captured information and/or at least a portion of any user information that has been received at 304, wherein the transparent overlay provides one or more transparent images that are pertinent to the physical surroundings. For instance, the server may identify one or more entities in the visual information using at least a portion of the received information. Thus, the server may support pattern recognition, as well as other features. The server may also identify one or more entities that are within a specific distance from the location of the reality overlay device. The server may obtain information that is pertinent to the identified entities and/or ascertain a desired placement of the overlay information with respect to the identified entities, where the overlay information indicates the desired placement of visual overlay information within the transparent overlay. The server may then transmit the overlay information to the device at 306.

The reality overlay device may be used to generate virtual billboards for use in a variety of contexts. A virtual billboard may function as a physical billboard would in the real world. For example, a virtual billboard may include the name of a business, an advertisement associated with a business, an offer associated with a business, a menu, or any other information associated with a business or an affiliate business. The presentation of virtual billboards will be described in further detail below with reference to FIGS. 4-9.

Figure 4:
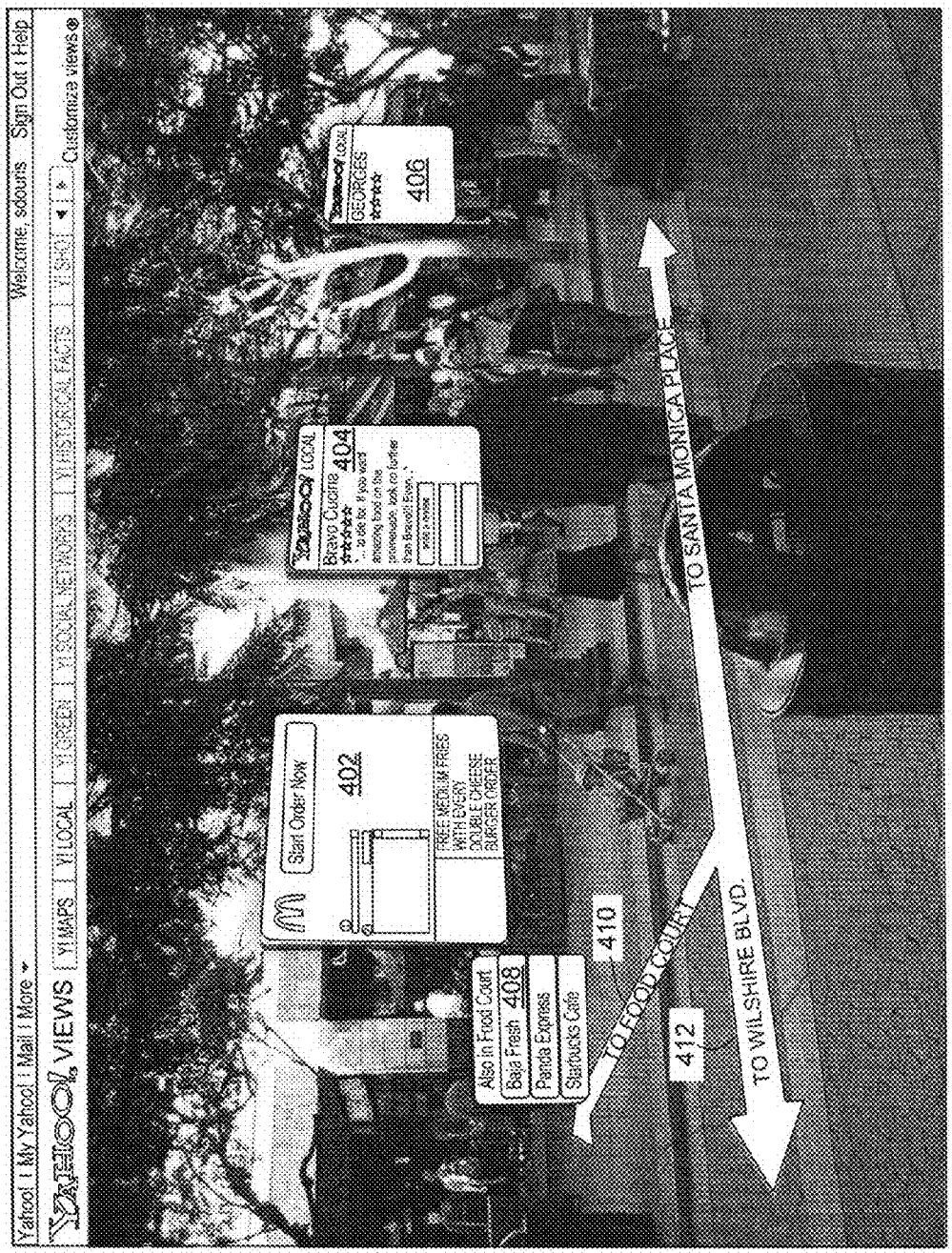
FIG. 4 is a diagram illustrating an example local view including virtual billboards that may be presented in accordance with various embodiments.

FIG. 4 is a diagram illustrating an example local view including virtual billboards that may be presented in accordance with various embodiments. As shown in the local view, the transparent overlay that is superimposed by a reality overlay device may include one or more virtual billboards. Each of the virtual billboards may be placed in close proximity to a business or entity with which it is associated. For instance, a virtual billboard may be placed such that it is overlaid next to and/or in front of a business in the user's field of vision. Thus, the overlay information may indicate placement of each of the virtual billboards with respect to a corresponding business.

In this example, the transparent overlay includes three different virtual billboards, each of which is placed in front of a business (e.g, restaurant) with which it is associated. The first virtual billboard 402 is a billboard associated with a McDonald's restaurant, the second virtual billboard 404 is a billboard associated with Bravo Cucina restaurant, and the third virtual billboard 406 is associated with Georges restaurant 408. As shown at 402, a virtual billboard may provide an advertisement, menu and/or additional functionality. For instance, a user may place an order to the business via the associated virtual billboard and/or pay for the order electronically, enabling the user to walk in to the business and pick up the order. As one example, the user may place the order via a command such as a voice command such as "place order at McDonalds." As another example, the user of the reality overlay device may virtually touch a "Start Order Now" button that is displayed in the transparent overlay by lifting his or her hand into the user's field of vision. In this manner, the user may silently interact with the reality overlay device using a gestural interface. Such physical movements may also be used to modify the transparent overlay. For instance, the user may "grab and pull" to increase the size of a virtual billboard or menu, or "grab and push" to reduce the size of a virtual billboard or menu.

The system may consider the viewer's preferences in order to provide an appropriate virtual billboard. For instance, the system may determine from the viewer's past purchases at McDonalds and other restaurants that the viewer prefers French fries. Thus, the user's preferences may be used to determine whether the virtual billboard 402 is presented, the size of the virtual billboard 402, and/or the contents of the virtual billboard 402. For instance, as shown in this example, the virtual billboard 402 may present a picture of French fries. However, if the viewer does not like McDonalds or similar food, the business owner may not wish to pay for unnecessary advertising costs, and choose not to provide the virtual billboard 402 to this user. Alternatively, the business owner may choose to provide a default virtual billboard, or choose to reduce the size of the virtual billboard.

In addition, as shown at 404 and 406, a virtual billboard may display additional information associated with a business. For instance, a virtual billboard may display user reviews of an associated business. These user reviews may be retrieved by a server from a database storing user reviews.

A virtual billboard may merely include a name of one or more business establishments, as shown at 408. More specifically, a virtual billboard may include a name of the business, as well as any other additional information. In this example, the virtual billboard 408 advertises a Food Court, as well as the names of the restaurants in the Food Court. In this manner, additional restaurants within a specific distance (e.g., on the same block) of the location of the user may be advertised.

A transparent overlay may also include directions to a business establishment associated with a virtual billboard. The directions may include one or more symbols and/or text. As shown at 410, an arrow and associated text provide directions to the Food Court advertised by the virtual billboard shown at 408. More specifically, the directions provided at 410 are shown such that the directions 410 overlay the ground (e.g., sidewalk and/or street). In this manner, directions may be placed in a location of the transparent overlay such that the user's view is not obstructed.

In this example, the virtual billboards are shown to be rectangular in shape. However, the size and/or shape of a virtual billboard may be determined based upon a variety of factors. For instance, the size and/or shape of a virtual billboard may be determined based upon the size of a business in the visual information that has been captured, the number of virtual billboards to be displayed in the transparent overlay, user preferences and/or preferences of the business for which a virtual billboard is displayed. A virtual billboard may be shown in two-dimensional or three-dimensional form. Moreover, the virtual billboard may incorporate a variety of media including, but not limited to, animated media or representations of products and/or services that the business establishment sells.

The transparent overlay may also include geographic information. The geographic information may include one or more symbols (e.g., arrows, etc.) and/or associated text. For instance, the geographic information may identify street names such as cross streets and/or other directions. As shown at 412, the geographic information includes cross street names, "Wilshire Blvd." and "Santa Monica Place." Through the use of virtual billboards, the need for physical billboards, signs, and flyers may be eliminated. In this manner, pollution may be eliminated and the natural landscape may be preserved.

Processes similar to those set forth above with respect to FIGS. 2 and 3 may be applied in order to generate virtual billboards via a reality overlay device. More particularly, the operation of generating virtual billboards via a reality overlay device and corresponding server are described in further detail below with reference to FIGS. 5-6.

Figure 5:
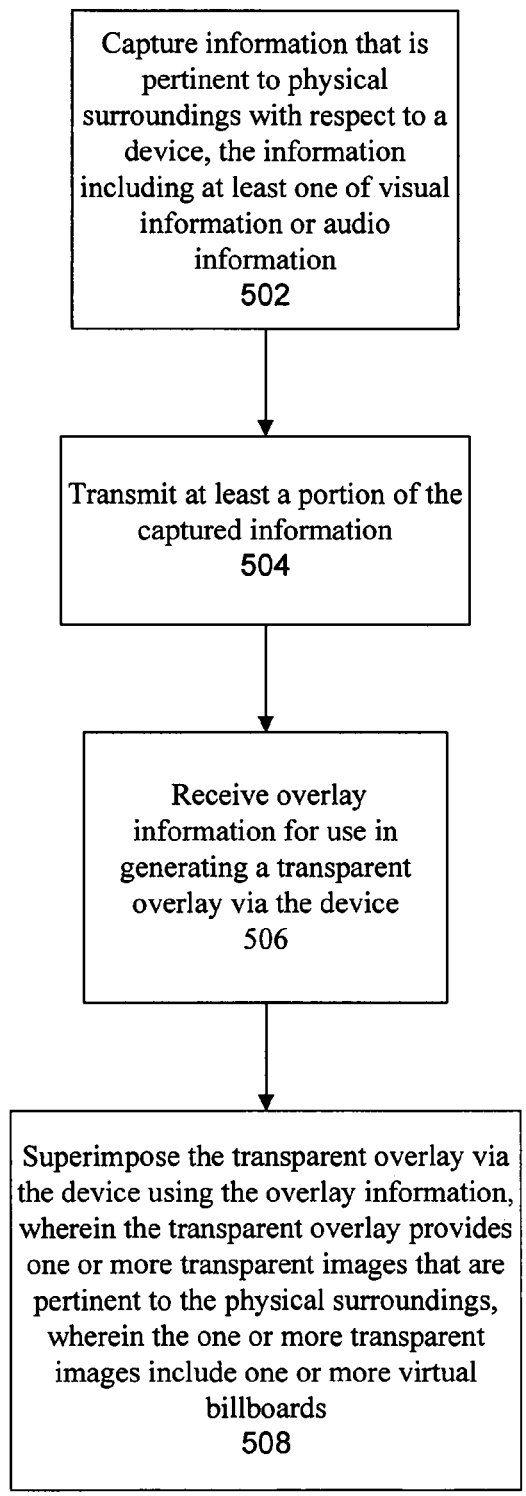
FIG. 5 is a process flow diagram illustrating an example method of presenting virtual billboards via a reality overlay device such as that presented in FIG. 1.

FIG. 5 is a process flow diagram illustrating an example method of presenting virtual billboards via a reality overlay device such as that presented in FIG. 1. The reality overlay device automatically captures information that is pertinent to physical surroundings with respect to the reality overlay device at 502, the information including at least one of visual information or audio information. The information that is pertinent to the surroundings with respect to the device may also include additional information such as the location of the reality overlay device, an orientation of the device, and/or a speed with which the device is traveling.

Other information that may be captured by the reality overlay device is the identity of various entities (e.g., businesses) using at least a portion of the received information. This may be accomplished via GPS coordinates, RFID, and/or pattern recognition. In addition, user information such as the identity of the user and/or user preferences may also be captured for transmission to the server.

Since it is impractical to store all virtual billboards locally, the reality overlay device may receive virtual billboards from a remotely located server. Thus, the reality overlay device may automatically transmit at least a portion of the captured information to another network device (e.g., server) at 504. More specifically, the reality overlay device may communicate with the network device via a wireless network over the Internet.

The reality overlay device may then automatically receive overlay information from the server for use in generating a transparent overlay via the reality overlay device at 506. The overlay information may include one or more virtual billboards, as well as details indicating the placement of the virtual billboards within the transparent overlay. Such details may include the position of a virtual billboard, size of the virtual billboard, length of time that the virtual billboard is to be presented, etc.

The reality overlay device may then automatically superimpose the transparent overlay using the overlay information at 508, wherein the transparent overlay provides one or more transparent images that are pertinent to the physical surroundings and wherein the one or more transparent images include one or more virtual billboards, each of the virtual billboards including information associated with a business. More specifically, the virtual billboards may be superimposed with respect to (e.g, in correlation with) one or more associated businesses as identified using the captured information. For instance, placement of a virtual billboard may be determined based upon the location of the business and its position within a captured image. Thus, a virtual billboard may be placed in close proximity to the business (e.g., next to or in front of the business). This may be accomplished, for example, based upon the coordinates of the business. It may be desirable to provide directions in association with a virtual billboard in various circumstances, such as where the business is not immediately visible. In this manner, virtual billboards associated with businesses being viewed by the reality overlay device or in close proximity to the reality overlay device may be presented.

A virtual billboard may be interactive. In other words, a virtual billboard may enable information to be transmitted from the user's device to a business associated with the virtual billboard and/or received by the user's device from the business associated with the virtual billboard. Thus, a user may submit input (e.g., voice command, etc.) that is pertinent to the virtual billboard provided in the transparent overlay. For instance, where the virtual billboard includes a menu, the user may choose to order an item from the menu. The reality overlay device may then process the user input or transmit the user input to the business associated with the virtual billboard. In this manner, a user may submit a menu order via the reality overlay device.

Figure 6:
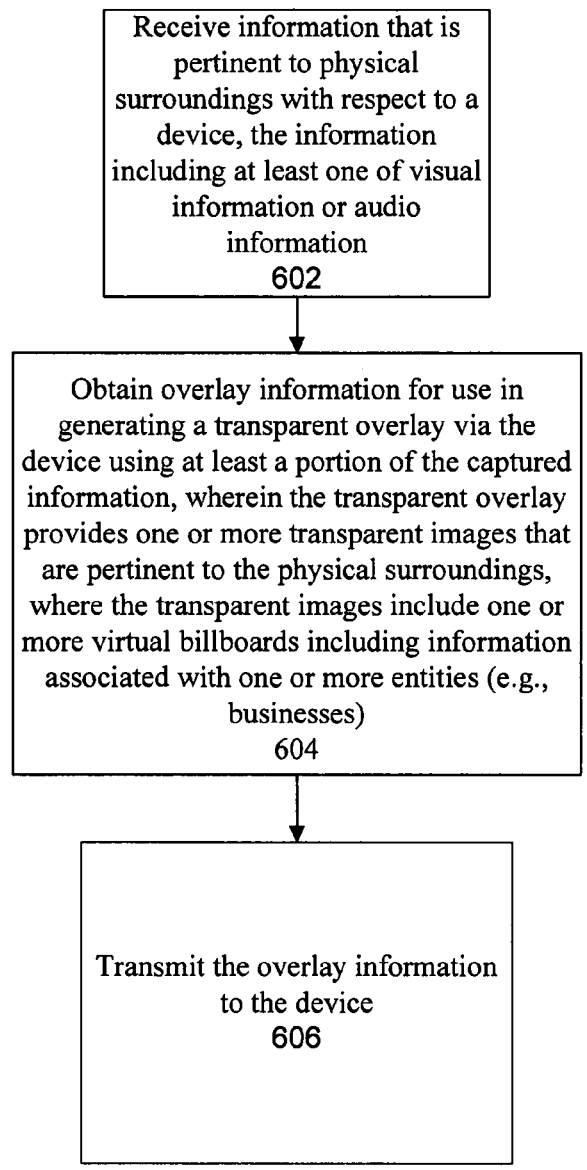
FIG. 6 is a process flow diagram illustrating an example method of providing virtual billboards to a reality overlay device such as that presented in FIG. 1.

FIG. 6 is a process flow diagram illustrating an example method of providing virtual billboards to a reality overlay device such as that presented in FIG. 1. The server receives information that is pertinent to physical surroundings with respect to a reality overlay device at 602, where the information includes at least one of visual information or audio information. Moreover, the information may also include the location of the reality overlay device, orientation of the reality overlay device, and/or speed with which the reality overlay device is traveling.

When the server receives the captured information, the captured information may identify one or more entities (e.g., businesses). In addition, the captured information may also include user information. User information that is received may indicate an identity of the user, the preferences of a user and/or history of purchases of a user. Such preferences may indicate restaurant and/or menu preferences. Such preferences may also indicate whether the user wishes to receive virtual billboards, as well as his or her preferences as to size and/or placement of such virtual billboards.

Where the captured information does not specifically identify one or more entities or user preferences, the server may identify one or more entities in the captured information via pattern recognition, GPS coordinates, or other means. For instance, the server may identify entities in close proximity to the location of the user. In addition, where the server knows the identity of the user, the server may retrieve associated user preferences.

The server obtains (e.g., generates) overlay information for use in generating a transparent overlay via the reality overlay device at 604 using at least a portion of the received information, wherein the transparent overlay provides one or more transparent images that are pertinent to the physical surroundings and where the transparent images include one or more virtual billboards including information associated with one or more entities (e.g., businesses). Thus, the server may identify one or more appropriate virtual billboards that are pertinent to these entities using at least a portion of the received information. More specifically, the server may search one or more databases for virtual billboards associated with any identified entities (e.g., businesses). Moreover, the server may consider any business preferences in selecting a virtual billboard, such as the distance of the device from the business. For example, where the user is not within a particular distance from the business, a virtual billboard associated with an affiliate of the business that is closer to the user may be presented. As another example, where the user does not like the type of product that the business offers, the business may wish to make a recommendation to the user of another affiliate establishment in the area that may offer products and/or services that more closely match the user's preferences.

In addition, the server may consider the user's identity and any associated user preferences in selecting a particular virtual billboard. For example, assume that a user is walking along a street along a row of restaurants. The user's preferences may indicate that the user likes Thai food, and may also identify dishes that the user prefers or that the user typically orders. Where one of the restaurants in the row of restaurants is a Thai restaurant, the server may determine from the business preferences that the business has requested that if a Thai food lover is in physical proximity of or looks at the Thai restaurant via the reality overlay device, a particular virtual billboard should be provided to the user's device. For instance, the virtual billboard may display the user's favorite dish. If the restaurant does not serve this particular dish, the server may instead make a best guess determination of a similar dish in the restaurant's menu and present this to the reality overlay device of the user instead. Moreover, if the customer's favorite food is not Thai, but he will eat it sometimes, then the size of the virtual billboard may be reduced. Similarly, if the user does not like Thai food, the server may not provide a virtual billboard associated with this Thai restaurant to the user's device. Rather, if the user likes hamburgers, a virtual billboard providing directions to the nearest In-N-Out Burger may be provided. In this manner, virtual billboards may be tailored to a user's preferences.

Once one or more virtual billboards have been selected, any business and/or user preferences may be used to further customize a virtual billboard. For instance, such preferences may be used to modify the size of a virtual billboard and/or the conditions in which the virtual billboard is displayed. As another example, a business may wish that a virtual billboard be displayed in front of the business or next to the business. In this manner, the server may ascertain a placement of the one or more virtual billboards with respect to the identified entities (e.g., businesses).

The server may then transmit the overlay information to the reality overlay device at 606. As set forth above, the overlay information may indicate the placement of the virtual billboard(s) within a transparent overlay, the size and shape of the virtual billboard(s), etc.

In accordance with various embodiments, a virtual billboard may also be transmitted to a device that is not a reality overlay device. For example, the device may be a portable device such as a cell phone, etc. Thus, a virtual billboard may simply include text associated with an entity such as a business. More specifically, text may be transmitted to such a device via a text messaging service. For example, the virtual billboard may include an advertisement or an offer associated with a business that is in close proximity to the user. This is particularly useful in situations in which the business is not easily visible to the user and the user is traveling in areas in which the user is unfamiliar.

Figure 7:
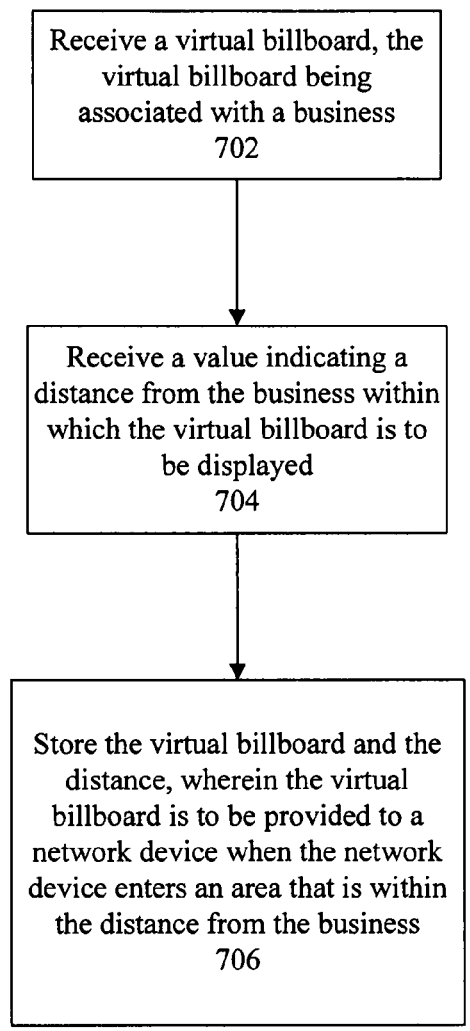
FIG. 7 is a process flow diagram illustrating an example method of receiving virtual billboard submissions in accordance with one embodiment.

In order to establish virtual billboards and the conditions in which they are presented, a business may submit these virtual billboards online via a website. FIG. 7 is a process flow diagram illustrating an example method of receiving virtual billboard submissions in accordance with one embodiment. A server associated with the website may receive a virtual billboard, where the virtual billboard is associated with a business at 702. As set forth above, the virtual billboard may include any information associated with a business and may represent a physical billboard. Alternatively, the virtual billboard may simply include text. The server may also receive information (e.g., a value) indicating a distance from the business within which the virtual billboard is to be displayed via a network device at 704. In other words, when a user travels into an area that is within the specified distance from the business, the virtual billboard may be transmitted to the user's network device. The network device may be a reality overlay device, but need not be a reality overlay device. The server may then store the virtual billboard and the distance at 706, along with any other business preferences, such as the size of the virtual billboard, location of the virtual billboard with respect to the business, etc. The server may also store a fee structure associated with managing and transmitting the virtual billboards for the business. For instance, the business may be charged a flat fee for a period of time, a fee per virtual billboard transmission, and/or a fee associated with the specified distance or size of the virtual billboard. Thus, a business may be charged more for a larger distance. In this manner, a business may be charged for advertising in "virtual space."

Figure 8:
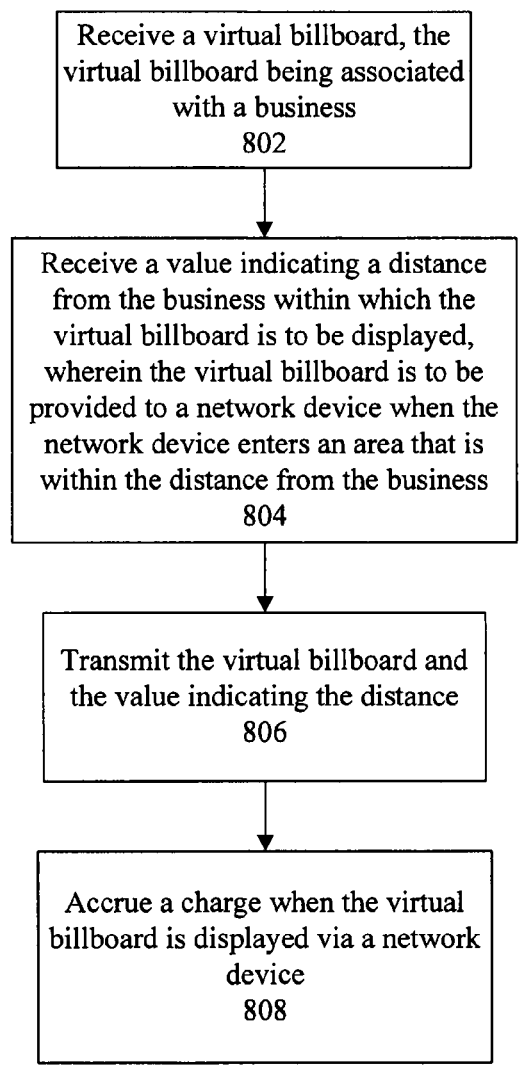
FIG. 8 is a process flow diagram illustrating an example method of submitting virtual billboards in accordance with one embodiment.
Figure 9:
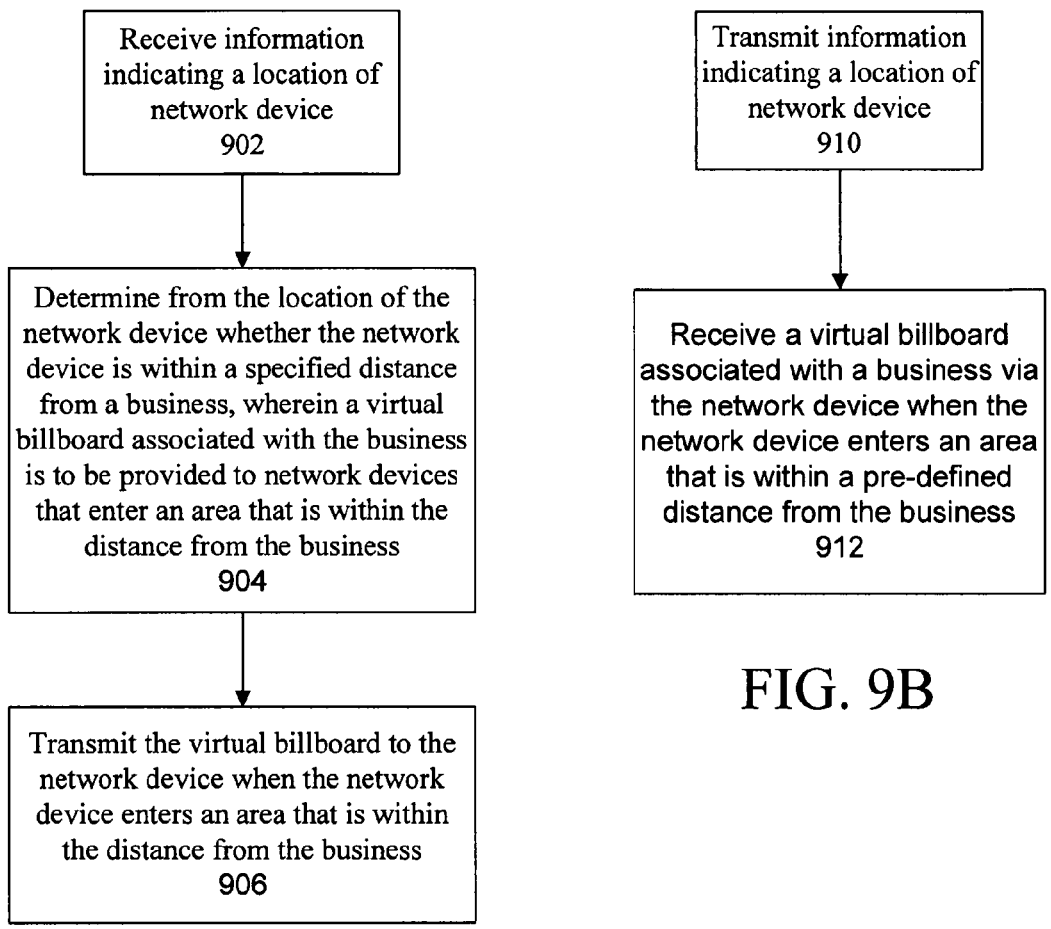
FIGS. 9A-9B are process flow diagrams that illustrate methods of presenting a virtual billboard via a device in accordance with one embodiment.

FIG. 8 is a process flow diagram illustrating an example method of submitting virtual billboards in accordance with one embodiment. A network device (e.g., located at a business) may receive a virtual billboard from a user, where the virtual billboard is associated with a business at 802. In addition, the network device may receive information (e.g., a value) indicating a distance from the business within which the virtual billboard is to be displayed via a device (e.g., reality overlay device or portable device) at 804, wherein the virtual billboard is to be provided to a device when the device enters an area that is within the distance from the business. The network device may transmit the virtual billboard and the information indicating the distance from the business within which the virtual billboard is to be displayed via a device to a server associated with the web site at 806, where the web site is responsible for managing virtual billboards and their transmission.

The business may accrue a charge when the virtual billboard is displayed via a device. Similarly, the business may accrue a charge associated with the distance from the business within which the virtual billboard is to be displayed. In this manner, a business may be charged for "advertising time."

FIGS. 9A-9B are process flow diagrams that illustrate methods of presenting a virtual billboard via a device in accordance with one embodiment. As shown in FIG. 9A, a server may receive information indicating a location of a device at 902. The server may determine from the location of the device whether the device is in physical proximity of the business (e.g., within a specified distance from the business), wherein a virtual billboard associated with the business is to be provided to devices that enter an area that is within the distance from the business at 904. More specifically, the virtual billboard may be selected based upon the preferences of the business, as set forth above. The server may then transmit the virtual billboard to the device if it is determined that the device has entered the area that is within the distance from the business at 906.

As set forth above, the virtual billboard that is selected and transmitted may also be identified by preferences of the user. Thus, where the server has received user information (e.g., user identifier, device identifier or IP address) associated with a user of the device, the server may identify preferences of the user using the user information. For instance, the user may prefer McDonald's over Burger King. The server may then identify the virtual billboard that corresponds to the preferences of the user, or control transmission of virtual billboards in accordance with the user's preferences. Thus, even if the user enters an area that is within a specified distance from Burger King, the server may not transmit the virtual billboard to the user's device. Rather, the server may determine whether Burger King has an affiliate business within the vicinity of the user, and provide a virtual billboard for the affiliate business instead.

FIG. 9B is a process flow diagram illustrating the operation of a device that receives a virtual billboard when it approaches an associated business. Specifically, the device may transmit information indicating a location of the device at 910. The device may also transmit user information indicating an identity of a user of the device and/or preferences of the user. The device may then receive a virtual billboard associated with a business when the device enters an area that is within a predefined distance from the business. The virtual billboard that is received may be selected and therefore tailored to preferences of the user of the device. As set forth above, the virtual billboard may include information associated with a business or an affiliate of the business.

Upon receiving a virtual billboard (e.g., text message or display) via a device such as a cell phone, the device may further tailor the manner in which a virtual billboard is presented. For instance, the device may suppress virtual billboards based upon the user's preferences or settings.

The above description refers to the generation of virtual billboards. However, it is also important to note that information may also be provided audibly as well as visually. Thus, in some embodiments, audio information that is pertinent to a virtual billboard is generated from at least a portion of the received information and provided via one or more audio inputs of the reality overlay device.

Figure 10:
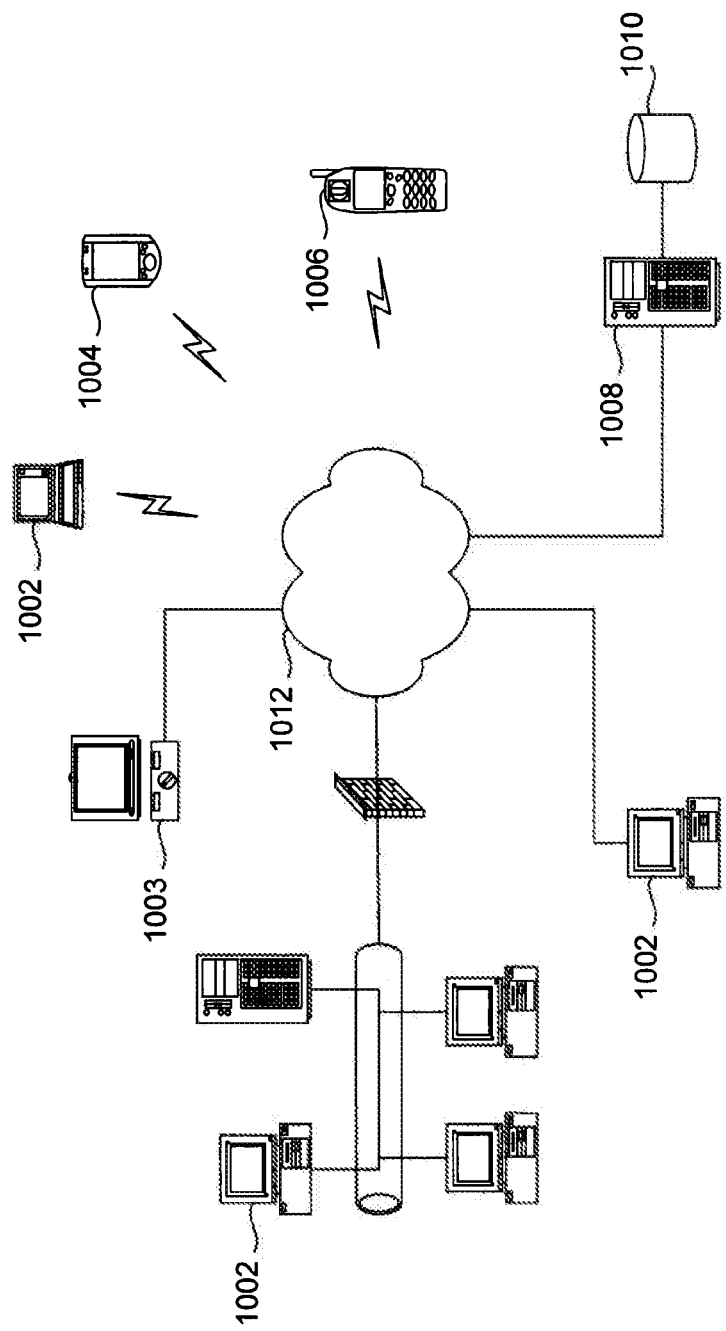
FIG. 10 is a simplified diagram of a network environment in which specific embodiments of the present invention may be implemented.

Embodiments of the present invention may be employed to support the operation of a reality overlay device or any device suitable for generating, transmitting, or displaying virtual billboards in any of a wide variety of contexts. For example, as illustrated in FIG. 10, implementations are contemplated in which a user implementing a reality overlay device 1000 interacts with a diverse network environment which may include other reality overlay devices, any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, server 1008 or any other type of device. Moreover, various embodiments may also be implemented by various handheld computing devices 1004, 1006, 1008.

And according to various embodiments, a virtual billboard or reality overlay information for use in generating an overlay including virtual billboards (e.g., visual transparent overlay and/or audio overlay) in accordance with the disclosed embodiments may be obtained using a wide variety of techniques. For example, the reality overlay information or virtual billboard may be obtained via a local application and/or web site and may be accomplished using any of a variety of processes such as those described herein. However, it should be understood that such methods of obtaining reality overlay information are merely examples and that the overlay information or virtual billboard may be obtained in many other ways.

A web site is represented in FIG. 10 by the server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations. Thus, computer-program instructions for performing various disclosed processes may be stored at the reality overlay device 1000, as well as the server 1008.

The disclosed techniques of the disclosed embodiments may be implemented in any suitable combination of software and/or hardware system, such as a web-based server used in conjunction with a portable device such as a cell phone or reality overlay device. The reality overlay device, portable device or server of this invention may be specially constructed for the required purposes, or may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, a reality overlay device 1000, the server 1008, and/or other devices in the network may each employ one or more memories or memory modules configured to store data, program instructions for the general-purpose processing operations and/or the inventive techniques described herein. The program instructions may control the operation of an operating system and/or one or more applications, for example. The memory or memories may also be configured to store data structures, maps, navigation software, virtual billboards, business preferences, user preferences, user purchase histories, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
capturing information that is pertinent to physical surroundings with respect to a first device;
transmitting at least a portion of the captured information from the first device to a second device;
receiving overlay information from the second device for use in generating a transparent overlay via the first device after it is determined that the first device has entered an area that is within a distance from a location of a physical entity of a business;
superimposing the transparent overlay via the first device using the overlay information, wherein the transparent overlay provides one or more transparent images that are pertinent to the physical surroundings, wherein the one or more transparent images include one or more virtual billboards, each of the virtual billboards including information pertaining to the business, thereby enabling a user to view the physical surroundings through the transparent overlay;
wherein the distance is specified by the business, wherein the business is charged a fee that corresponds to the distance.

2. The method as recited in claim 1, further comprising:
wherein superimposing the transparent overlay includes providing the one or more virtual billboards with respect to one or more businesses identified in the captured information.

3. The method as recited in claim 1, wherein the overlay information indicates placement of the virtual billboards within the transparent overlay with respect to the business.

4. The method as recited in claim 3, wherein the placement of the virtual billboards is not pre-defined.

5. The method as recited in claim 3, wherein the placement of the virtual billboards reduces obstruction of a field of vision of the user.

6. The method as recited in claim 1, further comprising:
identifying one or more entities using at least a portion of the captured information; and
transmitting an identity of the entities to the second device, thereby enabling the second device to obtain the one or more virtual billboards.

7. The method as recited in claim 1, further comprising:
transmitting user information to the second device, wherein the user information is associated with a user of the device;
wherein the virtual billboards are tailored to preferences of the user of the device.

8. The method as recited in claim 1, wherein the information that is pertinent to the physical surroundings with respect to the first device includes at least one of a location of the device, an orientation of the device, or a speed with which the device is traveling.

9. The method as recited in claim 1, wherein one of the virtual billboards includes a menu, an advertisement, or information associated with an affiliate business.

10. The method as recited in claim 1, wherein the information pertains to products or services available from the business, the method further comprising:
transmitting the user input to the business to which the information pertains;
wherein the user input identifies one of the products or services being purchased by the user.

11. The method as recited in claim 1, wherein receiving user input comprises:
receiving a selection of the user via interaction of the user with at least a portion of the transparent overlay.

12. The method as recited in claim 1, wherein the one or more transparent images comprises two or more virtual billboards.

13. The method as recited in claim 1, wherein the one or more virtual billboards comprise video.

14. The method as recited in claim 1, further comprising:
receiving user input that is pertinent to at least a portion of the information in one of the virtual billboards that have been provided in the transparent overlay; and
processing the user input or transmitting the user input to the business to which the information pertains.

15. A method, comprising:
obtaining information that is pertinent to physical surroundings with respect to a device;
obtaining overlay information for use in generating a transparent overlay via the device using at least a portion of the received information, wherein the transparent overlay provides one or more transparent images; and
transmitting the overlay information to the device after it is determined that the device has entered an area that is within a distance from a location of one or more physical entities of a business, wherein the one or more transparent images include one or more virtual billboards including information associated with the one or more physical entities in the physical surroundings, wherein the overlay information indicates a placement of the one or more virtual billboards with respect to the physical entities, wherein the physical entities do not include a physical billboard;
wherein the distance is specified by the business, wherein the business is charged a fee that corresponds to the distance.

16. The method as recited in claim 15, wherein the information that is pertinent to the physical surroundings with respect to the device includes at least one of a location of the device, an orientation of the device, or a speed with which the device is traveling.

17. The method as recited in claim 15, further comprising:
receiving user information associated with a user of the device;
wherein obtaining overlay information for use in generating a transparent overlay via the device includes obtaining the one or more virtual billboards using at least a portion of the received information and at least a portion of the user information.

18. The method as recited in claim 17, wherein the user information identifies one or more friends of the user or a history of purchases of the user.

19. The method as recited in claim 15, further comprising:
identifying the one or more physical entities using at least a portion of the received information;
wherein obtaining the overlay information includes obtaining the virtual billboards that are pertinent to the identified physical entities.

20. The method as recited in claim 15, further comprising:
identifying the one or more physical entities using at least a portion of the received information; and
ascertaining the placement of the one or more virtual billboards with respect to the identified physical entities 21. The method as recited in claim 15, wherein at least one of the virtual billboards enables information to be transmitted to a business identified within the virtual billboard.

22. The method as recited in claim 15, further comprising:
obtaining virtual billboard preferences associated with the physical entities;
wherein obtaining overlay information for use in generating a transparent overlay via the device includes obtaining the one or more virtual billboards using at least a portion of the received information and the virtual billboard preferences associated with the physical entities.

23. The method as recited in claim 15, wherein the virtual billboards do not correspond to physical billboards.

24. The method as recited in claim 15, wherein the physical entities comprise a business.

25. A non-transitory computer-readable medium storing thereon computer-readable instructions, comprising:
instructions for receiving information indicating a location of a network device;
instructions for determining from the location of the network device whether the network device is within a distance from a location of a physical entity of a business, wherein virtual billboard information including information pertaining to the business is to be provided to devices that enter an area that is within the distance from the location of the physical entity of the business; and
instructions for transmitting the virtual billboard information to the network device if it is determined that the network device has entered the area that is within the distance from the location of the physical entity of the business, thereby enabling the network device to display a virtual billboard based, at least in part, on the virtual billboard information;
wherein the distance is specified by the business, wherein the business is charged a fee that corresponds to the distance.

26. The non-transitory computer-readable medium as recited in claim 25, further comprising:
instructions for receiving user information associated with a user of the device, the user information indicating prior purchases of the user; and instructions for identifying the virtual billboard that corresponds to the user information.

27. The non-transitory computer-readable medium as recited in claim 25, wherein transmitting the virtual billboard information to the network device comprises transmitting a video.

28. The non-transitory computer-readable medium as recited in claim 25, wherein the virtual billboard information indicates at least one of a size of the virtual billboard, a shape of the virtual billboard, or a length of time that the virtual billboard is to be displayed.

29. The non-transitory computer-readable medium as recited in claim 25, further comprising:
   instructions for obtaining billboard preferences specified by the business, wherein the billboard preferences indicate a location in which the virtual billboard is to be displayed with respect to the location of the business;
   instructions for ascertaining the location in which the virtual billboard is to be displayed with respect to the location of the business based, at least in part, upon the billboard preferences;
   wherein the virtual billboard information specifies the location in which the virtual billboard is to be displayed.

30. The non-transitory computer-readable medium as recited in claim 29, wherein the location of the business is determined based upon coordinates of the business.

31. An apparatus, comprising:
   a processor; and
   a memory, at least one of the processor or the memory being adapted for:
   transmitting information indicating a location of the apparatus;
   when the apparatus enters an area that is within a distance from a business, receiving a virtual billboard associated with the business via the apparatus and displaying the virtual billboard via the apparatus, wherein the virtual billboard includes an advertisement including information pertaining to the business; and
   transmitting user information indicating an identity of a user of the apparatus;
   wherein the virtual billboard is tailored to the user of the device based, at least in part, upon the user information;
   wherein the virtual billboard is interactive;
   wherein the distance is specified by the business, wherein the business is charged a fee that corresponds to the distance.

32. An apparatus, comprising:
   a processor; and
   a memory, at least one of the processor or the memory being adapted for:
   obtaining information that is pertinent to physical surroundings with respect to a device, the information including at least one of visual information or audio information;
   obtaining overlay information for use in generating a transparent overlay via the device using at least a portion of the received information, wherein the transparent overlay provides one or more transparent images that are pertinent to the physical surroundings; and
   transmitting the overlay information to the device, thereby enabling the device to present one or more virtual billboards including the transparent overlay, the transparent overlay including information associated with one or more entities, wherein the overlay information is transmitted after the device has entered an area that is within a distance from a location of the one or more entities;
   wherein the distance is specified by the one or more entities, wherein the one or more entities are charged a fee that corresponds to the distance.

33. The apparatus as recited in claim 32, wherein the information that is pertinent to the surroundings with respect to the device includes at least one of a location of the device, an orientation of the device, or a speed with which the device is traveling.

34. The apparatus as recited in claim 32, at least one of the processor or the memory being further adapted for:
   charging the business when the virtual billboard information is transmitted to the network device.

35. The apparatus as recited in claim 32, wherein the overlay information includes at least one of directions to the one or more entities, one or more reviews of the one or more entities, or a menu pertaining to the one or more entities.

36. The apparatus as recited in claim 32, at least one of the processor or the memory being further adapted for performing steps comprising:
   recording the visual information and the overlay information, thereby enabling the visual information to be displayed with the transparent overlay.

37. The apparatus as recited in claim 32, wherein the one or more virtual billboards are interactive.

* * * * *